May 7, 1935.  L. M. TAYLOR  2,000,049
AUTOMATIC VARIABLE PITCH PROPELLER
Filed April 19, 1934
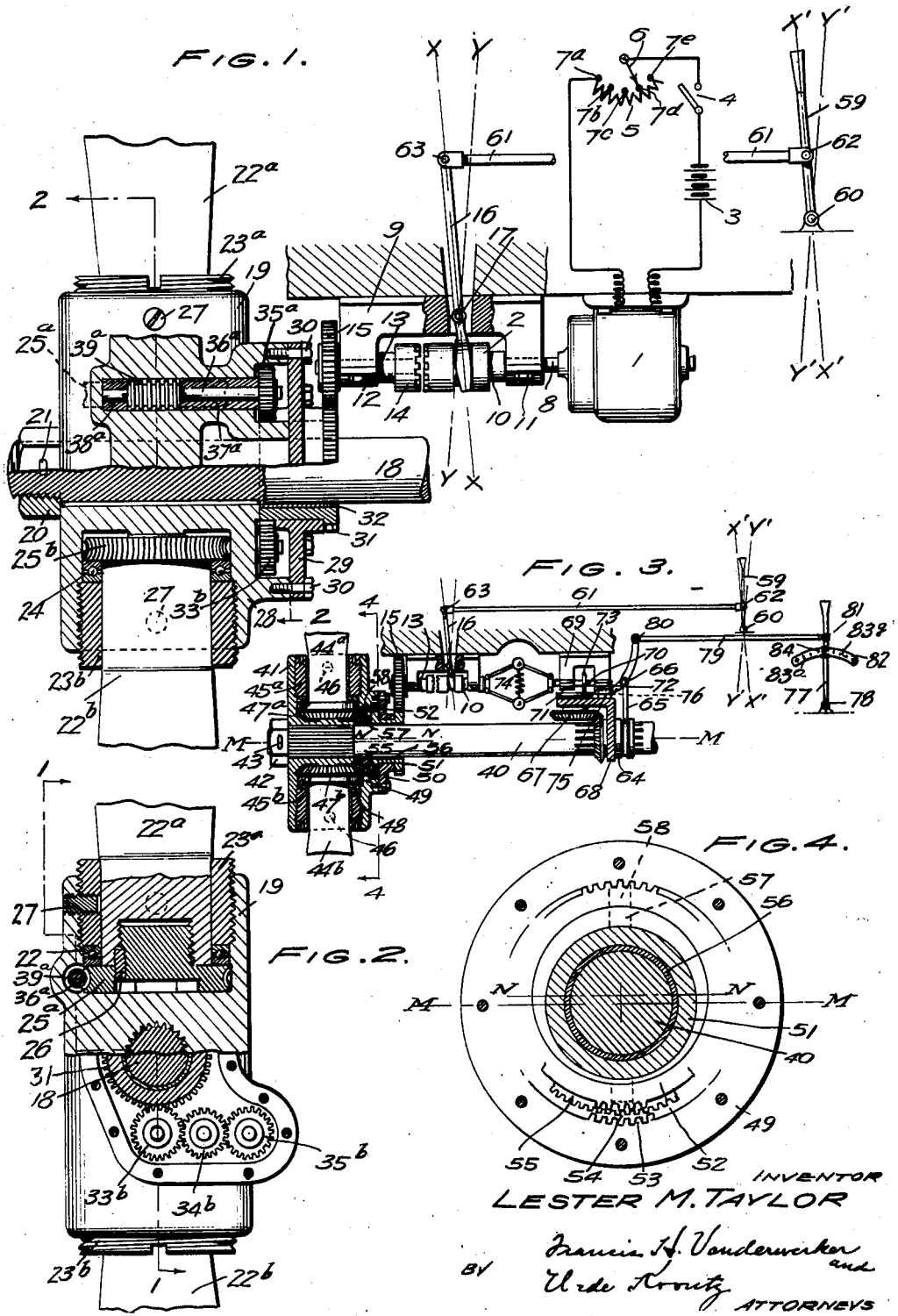
INVENTOR
LESTER M. TAYLOR Patented May 7, 1935

2,000,049

UNITED STATES PATENT OFFICE 2,000,049

AUTOMATIC VARIABLE PITCH PROPELLER

Lester M. Taylor, Dayton, Ohio

Application April 19, 1934, Serial No. 721,351

4 Claims. (Cl. 170—163)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for maintaining constant engine revolutions during all maneuvers of aircraft where the pilot employs fixed throttle settings.

By means of my invention, propeller blades are further automatically adjusted to that pitch angle which will permit maximum power output during take-off and climb.

As the aircraft continues to ascend, my invention still further effects readjustment of pitch angle to that best suited to each decrease in horse-power available with constantly increasing altitude.

Still another object of my invention is to automatically eliminate increase in engine revolution following execution by an aircraft of a diving maneuver.

With the foregoing and other objects in view, which will appear as the description proceeds, the invention consists of certain new and novel improvements in automatic, variable-pitch propellers which will be hereinafter more fully illustrated and described in the accompanying drawing and more particularly pointed out in the appended claims:

Referring to the drawing, in which numerals of like character designate similar parts throughout the several claims:

Fig. 1 is a side view in partial cross-section of one embodiment of my invention.

Fig. 2 is a sectional view taken on the line 2—2 of Fig. 1.

Fig. 3 is a side view of a second embodiment of my invention.

Fig. 4 is a sectional view taken on the line 4—4 of Fig. 3.

In Fig. 1 there are fixed with reference to an aircraft supporting the same, a motor 1 and a shaft disengaging mechanism 2. A power source 3, switch 4, and rheostat 5 are operatively connected to the motor 1. Through varied adjustments of a control arm 6 with contact points 7a through 7e of the rheostat 5, the motor 1 is rotated at a series of selected speeds. A drive shaft 8, connected to the motor 1 through a suitable system of reduction gears, is journalled to a housing 9 of the disengaging mechanism 2 and splined at its outermost extremity to freely slidably support a combined collar and clutch member 10. The drive shaft 8 may be readily detached from the housing 9 by removal of a bearing cap 11. The housing 9 is further provided with a bearing cap 12 to permit ready removal of a driven shaft 13 therefrom. One extremity of the driven shaft 13 is provided with a clutch member 14, adapted for engaging the combined collar and clutch member 10, while the other extremity thereof is provided with a driving gear 15. Longitudinal movement of the combined collar and clutch member 10 is accomplished through actuation of a forked lever 16, pivoted about a journal 17, mounted in the housing 9. Alternate coincidence of the longitudinal axis of the forked lever 16 with axis X—X, then axis Y—Y, effects alternate disengagement, then engagement, of the combined collar and clutch member 10 and the clutch member 14.

From the description of Figs. 1 and 2 which follows, it will become apparent that that portion of my invention which pertains solely to changing the pitch of propeller blades, may be readily accomplished through employment of numerous groupings of dissimilar parts such that each resulting mechanism is structurally different from its predecessor, though each accomplishes the same result. A propeller shaft 18 is journalled to an aircraft supporting the same. The forward extremity of the propeller shaft 18 is splined to receive a propeller hub 19, the former being fixedly secured to the latter by means of a check nut 20 and a cotter pin 21. Propeller blades 22a and 22b are journalled to the propeller hub 19 by means of bearing collars 23a and 23b and thrust bearings 24. Worm gears 25a and 25b are screwed into the bases of the propeller blades 22a and 22b and locked by set screws 26; while the bearing collars 23a and 23b are similarly screwed into the propeller hub 19 and locked against rotation therewith by set screws 27. The aft portion of the propeller hub 19 is furnished with a housing 28 provided with a split cover plate 29 and retaining screws 30. The plate 29 acts as a longitudinal guide for a double-faced pinion gear 31 journalled to the propeller shaft 18 by means of a bearing 32. The outer face of the gear 31 is in mesh with the driving gear 15 of the mechanism 2. As shown in Fig. 2, the inner face of the gear 31 is in mesh with a pinion gear 33b, which in turn engages a pinion gear 35b, through an intermediate gear 34b.

In Fig. 1, the pinion gear 35a is fixedly attached to a shaft 36a, which in turn is journalled to the propeller hub 19 by means of bearings 37a and 38a. A worm 39a is also fixed to the shaft 36a. Since the worm 39a is secured against longitudinal movement by the bearings 37a and 38a, it irreversibly locks the worm gear 25a and attached propeller blade 22a against rotation with respect to the bearing collar 23a. On the other hand, any desired change in "pitch" of the propeller blade 22a may be accomplished by appropriate rotation of the worm 39a.

Fig. 3 shows a second embodiment of my invention in which a propeller shaft 40 is journalled to an aircraft supporting the same. The forward extremity of the propeller shaft 40 is splined to receive a propeller hub 41, the former being fixedly secured to the latter by means of a check nut 42 and a cotter pin 43. Propeller blades 44a and 44b are journalled to the propeller hub 41 by means of bearing collars 45a and 45b and locked against rotation therewith by set screws 46. Bevel gears 47a and 47b are fixedly secured to the bases of the propeller blade 44. Thrust bearings 48 are inserted between the bevel gears 47a and 47b and the bearing collars 45a and 45b to permit the propeller blades 44a and 44b to turn freely while rotating during flight. The aft portion of the propeller hub 41 is furnished with a housing 49 provided with a split cover plate 50 and retaining screws 30. The plate 50 secures a combined cam and pinion gear 51 against longitudinal movement with respect to the housing 49. It will be noted that the pinion portion of the gear 51 is concentric about the longitudinal axis M—M of the propeller shaft 40, while the cam portion of the gear 51 is eccentric thereto, being concentric about an axis N—N. A ring gear 52 is mounted upon the cam portion of the gear 51. Through concentric relationship with the axis N—N, the upper portion of the gear 52 is momentarily held in meshed engagement with the upper portion of an internal gear 53, as shown in Figs. 3 and 4. Since the former is provided with a smaller number of teeth than the latter, a gap 54 exists between the lower portions of the gears 52 and 53. In operation, the ring gear 52 executes a combined wabbling and rotational motion within the internal gear 53. A bevel gear 55 is mounted upon a bearing 56 secured to the propeller shaft 40. The bearing 56 also supports the gear 51, which is maintained in operable engagement with the gear 55 by means of grooves 57 provided in the aft surfaces of the gear 55 and projections 58 provided upon the cam portion of the gear 51.

It is obvious from the above description that the propeller blade pitch-changing means of either Figs. 1 or 3 may be separately combined with the motor 1 and associated parts shown in Fig. 1. Remote control of the shaft disengaging mechanism 2 is accomplished through a lever 59 pivoted about a pin 60 and a yoked rod 61 pivotally secured to the levers 16 and 59 by means of pins 62 and 63.

Fig. 3 discloses an alternate mechanism performing the same function as the motor 1 and associated parts shown in Fig. 1. A combined collar and beveled gear 64 is splined to the propeller shaft 40 in such a manner that free longitudinal movement thereof may be effected by means of a forked lever 65 pivoted about a pin 66. A combined driving plate and beveled gear 67 is held in meshed engagement with the gear 64 by means of a bracket 68. A housing 69 is fixed with reference to an aircraft supporting the same. A shaft 70 is journalled to the housing 69 by means of bearing caps 71 and 72 in such a manner as to permit free longitudinal as well as rotational movement. A driven wheel 73 is fixed to the central portion of the shaft 70, one extremity of which is attached to an extremity of the governor mechanism 74. The other extremity of the governor mechanism 74 is secured to the combined collar and clutch member 10 of the shaft disengaging mechanism 2. During longitudinal adjustment of the gear 64 and associated parts, the bracket 68 is secured against rotation with respect to the propeller shaft 40 through sliding engagement of the projection 75 extending upward into a slot 76 provided in the bearing cap 72. Remote control of the forked lever 65 is accomplished through a lever 77 pivoted about a pin 78 and a yoked rod 79 pivotally secured to the levers 65 and 77 by means of pins 80 and 81. It will be noted that the central portion of the lever 77 is adapted to receive a semicircular plate 82 provided with scale graduations 83a through 83g adapted for alignment with a line of reference 84 provided in the lever 77.

The operation of that embodiment of my invention which is shown in Figs. 1 and 2 is as follows. The contact points 7a through 7e of the rheostat 5 are so arranged that the shaft 8 may be revolved at a series of known rates of speed comparable in magnitude to a like series of known rates of speed of the shaft 13, obtainable by the pilot through proper setting of his engine throttle, the exact magnitude of which may be readily checked by reference to the tachometer connected to the aircraft engine. Assuming the contact point 7a corresponds to full engine throttle and that the pilot has taken off under that condition of throttle setting, having previously positioned the lever 59 upon the axis $X^1$—$X^1$, placed the arm 6 upon the contact point 7a and closed the switch 4; after check reference to his tachometer, the pilot repositions the lever 59 upon the axis $Y^1$—$Y^1$. With engagement of the clutch members 10 and 14, the gear 15 is driven jointly by the motor 1 and the propeller shaft 18.

Let it be assumed that the pilot places his aircraft in an attitude of steep climb. The forward travel of the aircraft is greatly reduced over that covered in normal take-off and climb, resulting in increased horse-power absorption by the propeller blades, which at take-off were adjusted for the last-mentioned flight attitude. With increased horse-power absorption, the revolutions of the propeller shaft 18 commence to fall below those of the combined shafts 8 and 13. This revolution difference imparts a turning moment to the gear 31 with reference to the propeller hub 19, resulting in rotation of the propeller blades 22a and 22b about their longitudinal axes to a setting which substantially absorbs full throttle horse-power.

Reversal of the aforementioned blade adjustment is effected if the aircraft is maintained in steady climb until appreciable increases in altitude bring about well-known decreases in horse-power available, or, if for any given altitude the aircraft is suddenly changed from steep climb to level flight. Corresponding adjustments in passing from level flight to sudden dive, as well as transition to other aircraft maneuvers familiar to those skilled in the art, are each in their turn automatically cared for.

It is well to note at this point that my invention finds equal application to all ranges of throttle setting. As the pilot progressively closes his engine throttle, he effects corresponding readjustments of the arm 6 with respect to the contact points 7a through 7e of Fig. 1, or corresponding readjustments of the line of reference 84 on the lever 77 with respect to the scale graduation 83a through 83g on the semicircular plate 82 of Fig. 3, either manually or automatically through a proper system of linkage between the throttle lever and the arm 6 or the lever 77.

Referring to Fig. 3, prior to starting his engine, the pilot adjusts the line of reference 84 over the graduation 83a, thus placing the driven wheel 73 over the center of the driving plate portion of the gear 67, in which position no turning moment will be imparted to the driven wheel 73. With starting of the engine and advancement of the same to desired throttle setting, the pilot then adjusts the lever 77 to a corresponding setting. The latter setting is effected through varying the distance of the driven wheel 73 away from the center of the driving plate portion of the gear 67. The governor 74 provides an additional means for shifting the driven wheel 73 laterally along its axis of rotation, thereby automatically compensating for sudden increases or decreases in the rotation of the propeller shaft 40. Following proper coordination of engine throttle and the lever 77, the pilot repositions the lever 59 from the axis X¹—X¹ to the axis Y¹—Y¹. Upon engagement of the clutch members 10 and 14 the gear 15 is driven jointly by the governor 74 and the propeller shaft 40. If, through transition from one aircraft maneuver to another, the revolutions of the propeller shaft 40 commence to raise above or fall below those of the combined governor 74 and shaft 13, the resulting revolution difference imparts a turning movement to the gear 51 with reference to the propeller hub 41, resulting in rotation of the propeller blades 44a and 44b about their longitudinal axis to a setting which substantially absorbs full horsepower available for each given throttle setting.

I claim:

1. In a pitch control mechanism for aircraft a rotatable mount including propeller blades freely adjustable about their longitudinal axes, means carried by said mount for changing the pitch of said propeller blades, a shaft including means for driving the same at a series of predetermined constant speeds, and means for operatively coupling said pitch changing means with said shaft upon attainment of a predetermined relative rotational rate between said shaft and rotatable mount such that any deviation from the aforesaid relative rotational rate automatically actuates said propeller pitch changing means.

2. In a pitch control mechanism for aircraft a propeller hub having blades freely adjustable about their longitudinal axes, means carried by said hub for changing the pitch of said propeller blades, a shaft including a motor for driving the same at a series of predetermined constant speeds, and means for manually coupling said pitch changing means with said shaft upon attainment of a predetermined relative rotational rate between said shaft and propeller hub such that any deviation from the aforesaid relative rotational rate automatically changes the pitch of said propeller blades.

3. In a pitch control mechanism for aircraft a propeller hub fixed to the crankshaft of an engine and having blades freely adjustable about their longitudinal axes, means carried by said hub for changing the pitch of said propeller blades, an independent shaft including a motor actuated by said engine crankshaft for driving said independent shaft at a series of predetermined constant speeds, and means for manually coupling said pitch changing means with said independent shaft upon attainment of a predetermined relative rotational rate between said shaft and propeller hub such that any deviation from the aforesaid relative rotational rate automatically changes the pitch of said propeller blades.

4. In a pitch control mechanism for aircraft a propeller hub fixed to the crankshaft of an engine and having blades freely adjustable about their longitudinal axes, means carried by said hub for changing the pitch of said propeller blades, an independent shaft including an electric motor for driving said shaft at a series of predetermined constant speeds, and means for manually coupling said pitch changing means with said independent shaft upon attainment of a predetermined relative rotational rate between said shaft and propeller hub such that any deviation from the aforesaid relative rotational rate automatically changes the pitch of said propeller blades.

LESTER M. TAYLOR.